(12) United States Patent
Grosskopf et al.

(10) Patent No.: US 9,035,508 B2
(45) Date of Patent: May 19, 2015

(54) ROTATING RESISTOR ASSEMBLY

(75) Inventors: Andrew P. Grosskopf, Rockford, IL (US); Douglas J. Turner, Rockford, IL (US); Jan Henry Abels, Rockford, IL (US); Glenn C. Lemmers, Jr., Loves Park, IL (US); Timothy Pieper, Rockford, IL (US); David S. Behling, Belvidere, IL (US); Todd A. Spierling, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 579 days.

(21) Appl. No.: 13/466,436

(22) Filed: May 8, 2012

(65) Prior Publication Data

US 2013/0300231 A1 Nov. 14, 2013

(51) Int. Cl.
| | |
|---|---|
| H02K 11/00 | (2006.01) |
| H02K 19/26 | (2006.01) |
| H05K 7/20 | (2006.01) |
| H01C 1/01 | (2006.01) |
| H01C 1/02 | (2006.01) |
| H01C 1/14 | (2006.01) |
| H01C 13/02 | (2006.01) |
| H02K 19/38 | (2006.01) |
| H02K 11/04 | (2006.01) |
| H01C 1/16 | (2006.01) |
| H02K 5/22 | (2006.01) |

(52) U.S. Cl.
CPC .. *H01C 1/01* (2013.01); *H01C 1/02* (2013.01); *H01C 1/14* (2013.01); *H01C 13/02* (2013.01); *H02K 19/38* (2013.01); *H02K 5/225* (2013.01); *H02K 11/042* (2013.01); *H02K 11/0057* (2013.01); *H01C 1/16* (2013.01)

(58) Field of Classification Search
CPC ............................... H02K 11/00; H02K 19/28
USPC .................. 310/64, 68 D, 68 R, 71, 179, 180; 363/144, 145; 439/397, 510, 816
See application file for complete search history.

(56) References Cited

U.S. PATENT DOCUMENTS

| | | | | |
|---|---|---|---|---|
| 4,268,219 | A * | 5/1981 | Nakagawa et al. | 414/806 |
| 5,003,209 | A * | 3/1991 | Huss et al. | 310/68 D |
| 5,065,484 | A * | 11/1991 | Pinchott | 29/25.02 |
| 5,245,500 | A * | 9/1993 | Rozman | 361/56 |
| 5,587,616 | A * | 12/1996 | Johnsen | 310/68 D |
| 5,796,196 | A * | 8/1998 | Johnsen et al. | 310/68 D |
| 2007/0108854 | A1 * | 5/2007 | Osborn et al. | 310/68 D |

* cited by examiner

*Primary Examiner* — Jose Gonzalez Quinones
(74) *Attorney, Agent, or Firm* — Kinney & Lange, P.A.

(57) ABSTRACT

A resistor pack assembly includes a first mounting plate, a second mounting plate, a cylindrical suppression resistor, and a cylindrical cover. The first mounting plate has a circular face, a first connection terminal, and a second connection terminal. The second mounting plate has a circular face, a third connection terminal and a fourth connection terminal. The cylindrical suppression resistor has a first flat surface and a second flat surface opposite the first flat surface, and is located between the first mounting plate and the second mounting plate, wherein the first flat surface contacts the circular face of the first mounting plate and the second flat surface contacts the circular face of the second mounting plate. The cylindrical cover has an inner diameter aperture, wherein the first mounting plate, the second mounting plate, and the cylindrical suppression resistor are located within the inner diameter aperture of the cylindrical cover.

15 Claims, 9 Drawing Sheets

ROTATING RESISTOR ASSEMBLY

BACKGROUND

The present invention is related to generators, and in particular to a rotating resistor pack employed in a generator.

A typical generator assembly includes a rotor portion and a stator portion. Mechanical energy is provided to the generator via a shaft connected to the rotor portion that is converted into electrical energy that is provided via the stator portion.

Many generators take advantage of three stages, including a permanent magnet stage, an exciter stage and a main stage. The exciter stage includes an exciter stator winding for receiving DC power that energizes the exciter stator and generates the desired magnetic field. Rotational energy provided by the shaft causes the exciter rotor to move through the magnetic field, resulting in the generation of alternating current (AC) electric power in the exciter rotor. A rotating rectifier assembly is mounted within the rotor for converting the AC power to a direct current (DC) electric power that is supplied to the main rotor winding. The DC power provided to the rotating main rotor winding results in a rotating magnetic field that generates AC power in the stator windings.

Suppression resistors may also be included within or nearby the rotating rectifier assembly to provide an alternate path for voltage and current transients and protect the rotating rectifier assembly. However, the rotating rectifier assembly and the suppression resistors are mounted on the rotating shaft, and are therefore subject to the centrifugal forces associated with the rotating shaft.

SUMMARY

A resistor pack assembly includes a first mounting plate, a second mounting plate, a cylindrical suppression resistor, and a cylindrical cover. The first mounting plate has a circular face, a first connection terminal, and a second connection terminal. The second mounting plate has a circular face, a third connection terminal, and a fourth connection terminal. The cylindrical suppression resistor has a first flat surface and a second flat surface opposite the first flat surface, and is located between the first mounting plate and the second mounting plate, wherein the first flat surface of the resistor contacts the circular face of the first mounting plate and the second flat surface of the resistor contacts the circular face of the second mounting plate. The cylindrical cover has an inner diameter aperture, wherein the first mounting plate, the second mounting plate, and the cylindrical suppression resistor are located within the inner diameter aperture of the cylindrical cover.

DETAILED DESCRIPTION

Figure 1:
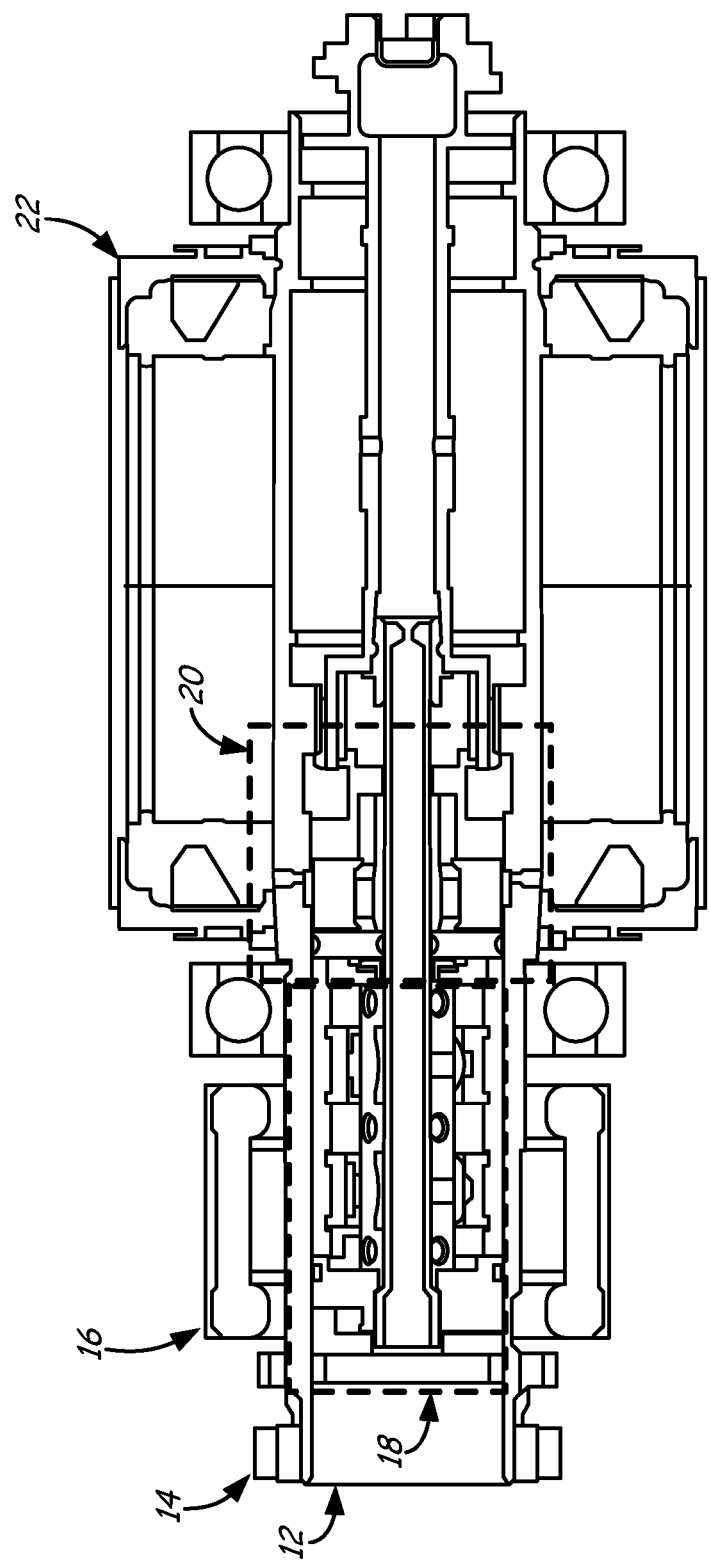
FIG. 1 is a cross-sectional view of rotating components included in a variable frequency generator according to an embodiment of the present invention.

FIG. 1 is a cross-sectional view of rotating components included in generator 10 according to an embodiment of the present invention. Generator 10 includes rotor shaft 12, exciter rotor 16, rectifier assembly 18, resistor pack 20, and main field winding 22. Rotor shaft 12 communicates mechanical energy to the rotating components mounted on the shaft, including exciter rotor 16, rectifier assembly 18, resistor pack 20, and main field winding 22.

DC voltage is supplied to the stator windings (not shown) located adjacent to the exciter rotor 16. Exciter rotor 16 rotates with rotor shaft 12, and generates an alternating current (AC) voltage in response to a magnetic field generated by an exciter stator (not shown) located adjacent to exciter rotor 16. The AC voltage is supplied to rectifier assembly 18, which rectifies the AC voltage to a rectified DC voltage. Resistor pack 20 receives the rectified DC voltage, and communicates the rectified DC voltage to main field winding 22.

Both rectifier assembly 18 and resistor pack 20 are mounted within an inner diameter of rotor shaft 12, and are therefore subjected to centrifugal forces associated with the rotation of rotor shaft 12. A benefit of locating rectifier assembly 18 and resistor pack 20 within the inner diameter of rotor shaft 12, is rectifier assembly 18 and resistor pack 20 are structurally supported by rotor shaft 12. Locating components within the inner diameter (ID) of rotor shaft 12 forces the shaft to a certain size to accommodate the components and adds to the stiffness of rotor shaft 12. Increased shaft stiffness increases a maximum obtainable speed of rotor shaft 12.

Figure 2:
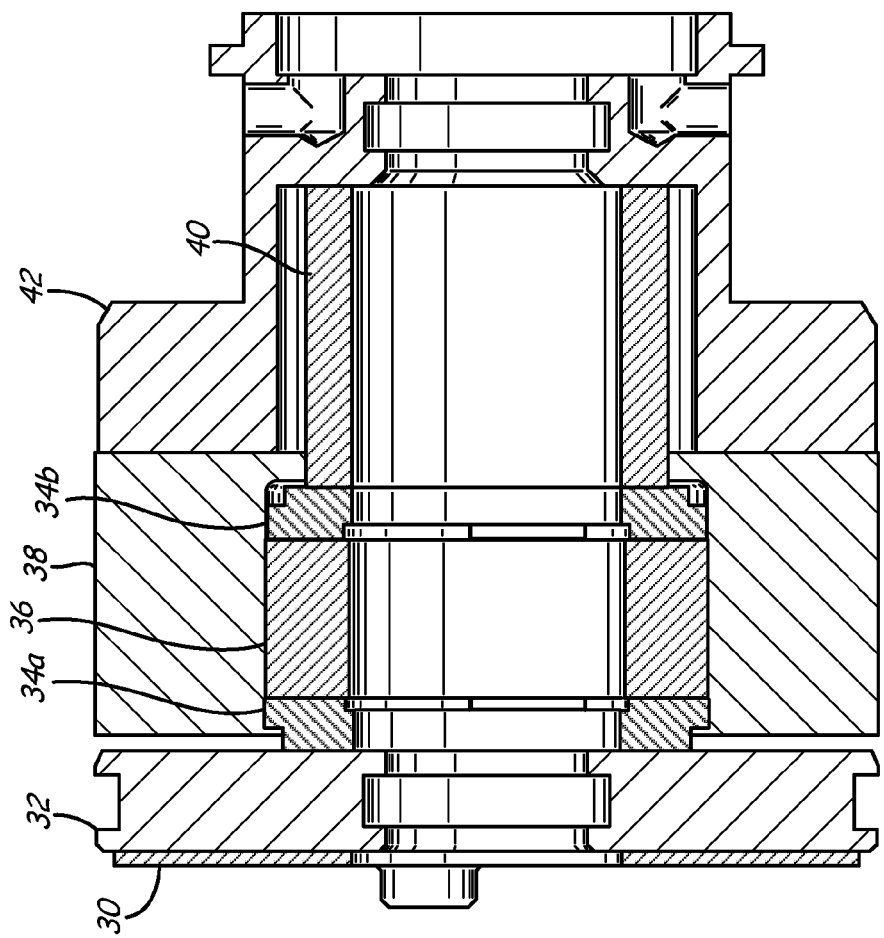
FIG. 2 is a cross-sectional view of the resistor pack assembly according to an embodiment of the present invention.

FIG. 2 is a cross-sectional view of the resistor pack assembly 20 according to an embodiment of the present invention. Resistor pack assembly 20 includes resistor housing washer 30, housing 32, mounting plates 34a, 34b, cylindrical suppression resistor 36, cover 38, cylindrical grounding resistor 40, and support assembly 42. Components included within resistor pack assembly 20 are sandwiched in place between resistor housing washer 30 and support assembly 42. In particular, cylindrical suppression resistor 36 is located between mounting plate 34a and mounting plate 34b. The combination of mounting plate 34a, cylindrical suppression resistor 36 and mounting plate 34b is located within an inner diameter of cover 38, which structurally supports cylindrical suppression resistor 36 and mounting plates 34a and 34b. Cover 38 also electrically isolates mounting plates 34a, 34b and cylindrical suppression resistor 36 from rotor shaft 12 (shown in FIG. 1). Cylindrical grounding resistor 40 is located interior of support assembly 42 and provides a ground fault path through rotor shaft 12 that prevents a build-up of charge on the main field windings that can damage the diodes in rectifier assembly 18 when discharged. In the embodiment shown in FIG. 2, resistors 36 and 40 are ceramic resistors, although in other embodiments various materials may be employed.

Figure 3:
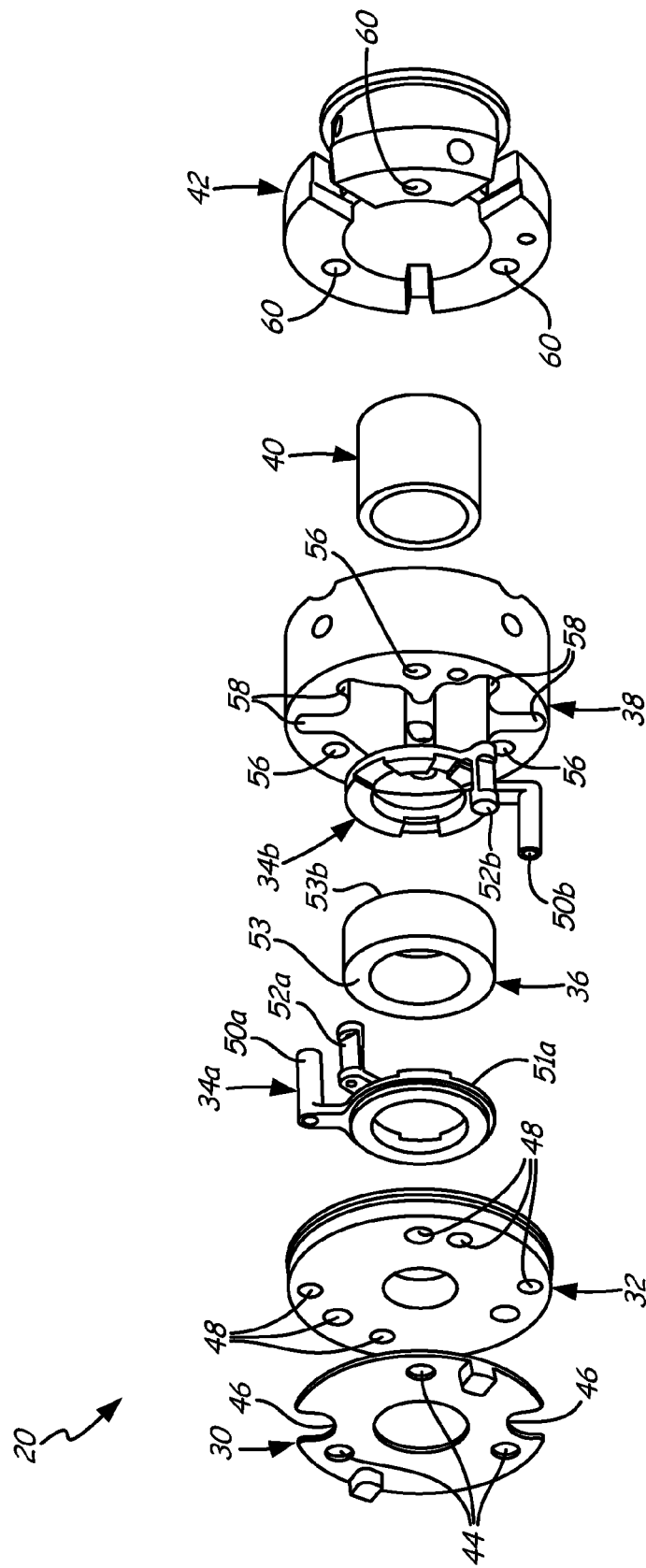
FIG. 3 is an exploded view of resistor pack assembly according to an embodiment of the present invention.

As discussed in more detail with respect to FIG. 3, resistor pack assembly is held in place via fasteners (e.g., bolts) connected through resistor housing washer 30, housing 32, cover 38, and support assembly 42. In this way, cylindrical suppression resistor 36 is held in place between mounting plate 34a and mounting plate 34b. Likewise, cylindrical grounding resistor 40 is held in place between mounting plate 34b and support assembly 42.

FIG. 3 is an exploded view of resistor pack assembly 20 according to an embodiment of the present invention. In the embodiment shown in FIG. 3, resistor pack assembly 20 once again includes resistor housing washer 30, housing 32, mounting plates 34a, 34b, cylindrical suppression resistor 36, cover 38, cylindrical grounding resistor 40, and support assembly 42.

Resistor housing washer 30 includes a plurality of apertures 44 for receiving fasteners (e.g., bolts) for securing components of resistor pack assembly 20 together. In addition, resistor housing washer 30 includes apertures or openings 46 for receiving connection pins (not shown) associated with rectifier assembly 18. Housing 32 is located adjacent to resistor housing washer 30 and also includes a plurality of apertures 48 for receiving fasteners and/or connection pins associated with rectifier assembly 18.

Mounting plate 34a is located adjacent housing 32, and includes circular face 51a, first connection terminal 50a, and second connection terminal 52a. Connection terminal 50a extends axially away from the body portion of mounting plate 34a, and includes a hollow portion (shown in more detail in FIGS. 4 and 5) for receiving a round contact bus bar associated with rectifier assembly 18. Connection terminal 52a also extends axially away from the body portion of mounting plate 34a, and includes two holes for receiving a wire that makes an electrical connection between mounting plate 34a and the main field winding 22. The wire (not shown) is soldered to the hole closest to housing 32 for securing the wire within connection terminal 52a.

Cylindrical suppression resistor 36 is located adjacent mounting plate 34a and mounting plate 34b, and includes first flat surface 53a and second flat surface 53b. In the embodiment shown in FIG. 3, cylindrical suppression resistor 36 is cylindrical, and does not include apertures for receiving a fastener. Rather, cylindrical suppression resistor 36 is sandwiched in place between circular face 51a of mounting plate 34a and circular face 51b of mounting plate 34b. In addition, the contact between circular face 51a and first flat surface 53a of cylindrical suppression resistor 36 provides an electrical connection between mounting plate 34a and cylindrical suppression resistor 36. Likewise, contact between circular face 51b and second flat surface 53b of cylindrical suppression resistor 36 provides an electrical connection between mounting plate 34b and cylindrical suppression resistor 36.

Mounting plate 34b is located adjacent to cylindrical suppression resistor 36, and includes circular face 51b, first connection terminal 50b, and second connection terminal 52b. Connection terminal 50b extends axially away from the body portion of mounting plate 34b, and includes a hollow portion (shown in more detail in FIGS. 4 and 5) for receiving a round contact bus bar associated with rectifier assembly 18. Connection terminal 52b also extends axially away from the body portion of mounting plate 34b, and includes two holes for receiving a wire that makes an electrical connection between mounting plate 34b and the main field winding 22. The wire (not shown) is soldered to the hole furthest from surface 51b for securing the wire within connection terminal 52b.

The combination of mounting plates 34a and 34b, and cylindrical suppression resistor 36 when pressed together form an assembly that is secured within an inner diameter of cover 38. Cover includes a plurality of apertures 56 for receiving fasteners provided via resistor housing washer 30 and housing 32. In addition, cover 38 includes a plurality of apertures 58 for receiving connection terminals 50a, 50b, 52a, and 52b from respective mounting plates 34a and 34b.

Cylindrical grounding resistor 40 is located adjacent cover 38, and is secured in place within the inner diameter of support assembly 42. Cylindrical grounding resistor 40 provides an electrical path to ground via grounding resistor 40 (typically a high resistance). In the embodiment shown in FIG. 3, rotor shaft 12 is grounded, and cylindrical grounding resistor 40 provides an electrical path to rotor shaft 12 to prevent an undesirable build-up of charge within rectifier assembly 18.

Support assembly 42 includes a plurality of apertures 60 for receiving fasteners provided via resistor housing washer 30, housing 32, and cover 38. Fasteners secured to support assembly 42 press the components of resistor pack assembly 20 into abutment with one another, securing those components that are not fastened.

Figure 4:
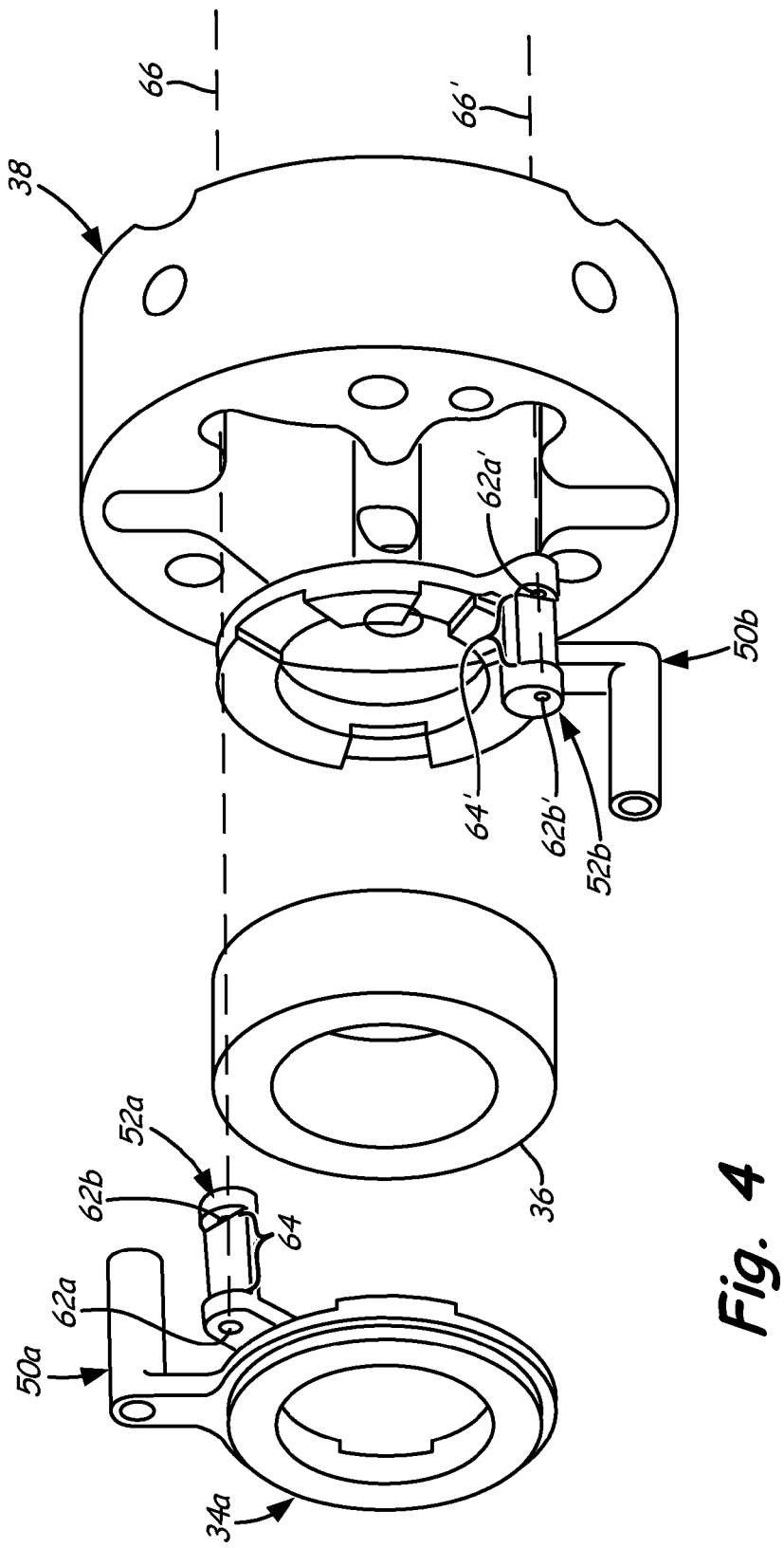
FIG. 4 is an exploded view of the mounting plates and resistor mounted within a cover/housing according to an embodiment of the present invention.

FIG. 4 is an exploded view of mounting plates 34a and 34b, and cylindrical suppression resistor 36 mounted within a cover/housing according to an embodiment of the present invention. In particular, FIG. 4 illustrates the connection of wire to the respective connection terminals 52a and 52b.

Connection terminal 52a located on mounting plate 34a includes a pair of apertures 62a and 62b and an open portion 64. Wire 66 is passed through the apertures 62a and 62b, with solder being supplied to the wire at aperture 62a to secure wire 66 to connection terminal 52a. Solder may not be applied to open portion 64 and/or aperture 62b because these details create a strain relief for wire 66. In the embodiment shown in FIG. 4, connection terminal 52a is received within an inner diameter of aperture 58, which provides support for connection terminal 52a. Wire 66 passes through to the opposite side of cover 38, and is provided for connection to main field winding 22.

Similarly, connection terminal 52b located on mounting plate 34b includes a pair of apertures 62a' and 62b' and an open portion 64'. Wire 66' is passed through the apertures 62a' and 62b', with solder being supplied to the wire at aperture 62b' (i.e., distal end of wire 66') to secure wire 66' to connection terminal 52b. Solder may not be applied to open portion 64' and/or aperture 62a' because these details create a strain relief for wire 66'. In the embodiment shown in FIG. 4, connection terminal 52b is received within an inner diameter of aperture 58', which provides support for connection terminal 52b. Wire 66' passes through to the opposite side of cover 38, and is provided for connection to main field winding 22.

Figure 5:
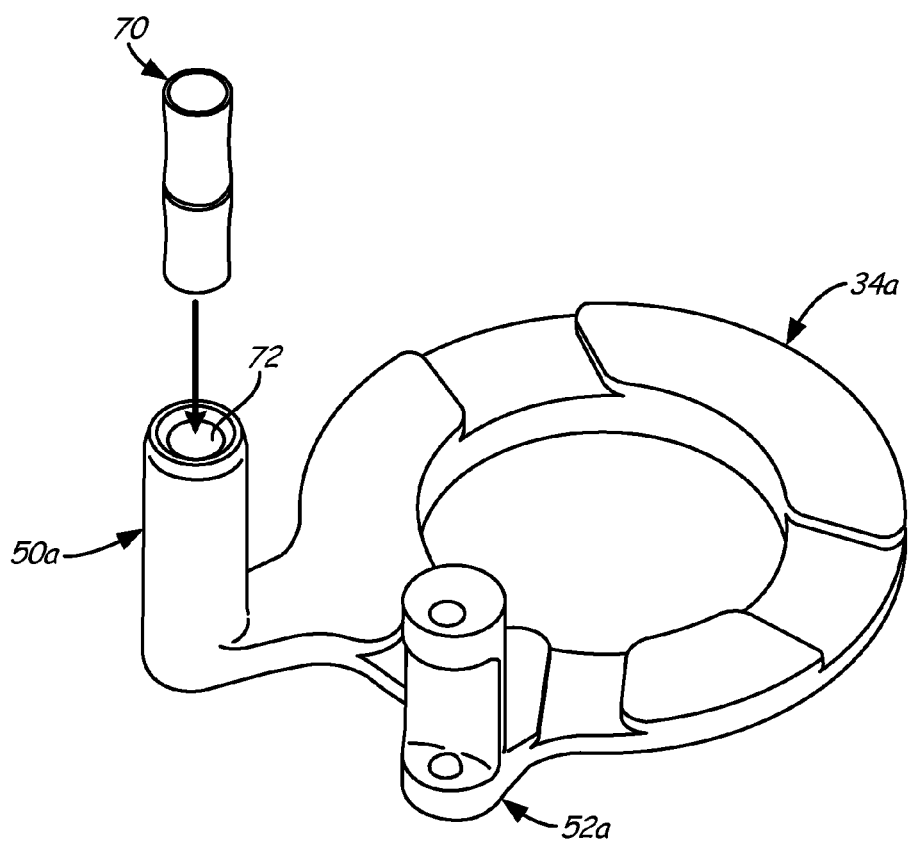
FIG. 5 is an exploded view that illustrates the placement of power bands within the axial sleeve of the mounting plate according to an embodiment of the present invention.

FIG. 5 is an exploded view that illustrates the placement of power band 70 within connection terminals 50a of mounting plate 34a. Power band 70 is a hollow sleeve that fits within the sleeve-like aperture (e.g., sleeve) 72 of connection terminal 50a. Power band 70 is a conductor that is configured to receive the round contact bus bar (shown in FIG. 6) associated with rectifier assembly 18. Axial extending connection terminal 50a with power band 70 allows rectifier assembly 18 to be electrically connected to resistor pack 20 simply by sliding round contact bus bars (shown in FIG. 6) into engagement with power band 70.

Figure 6:
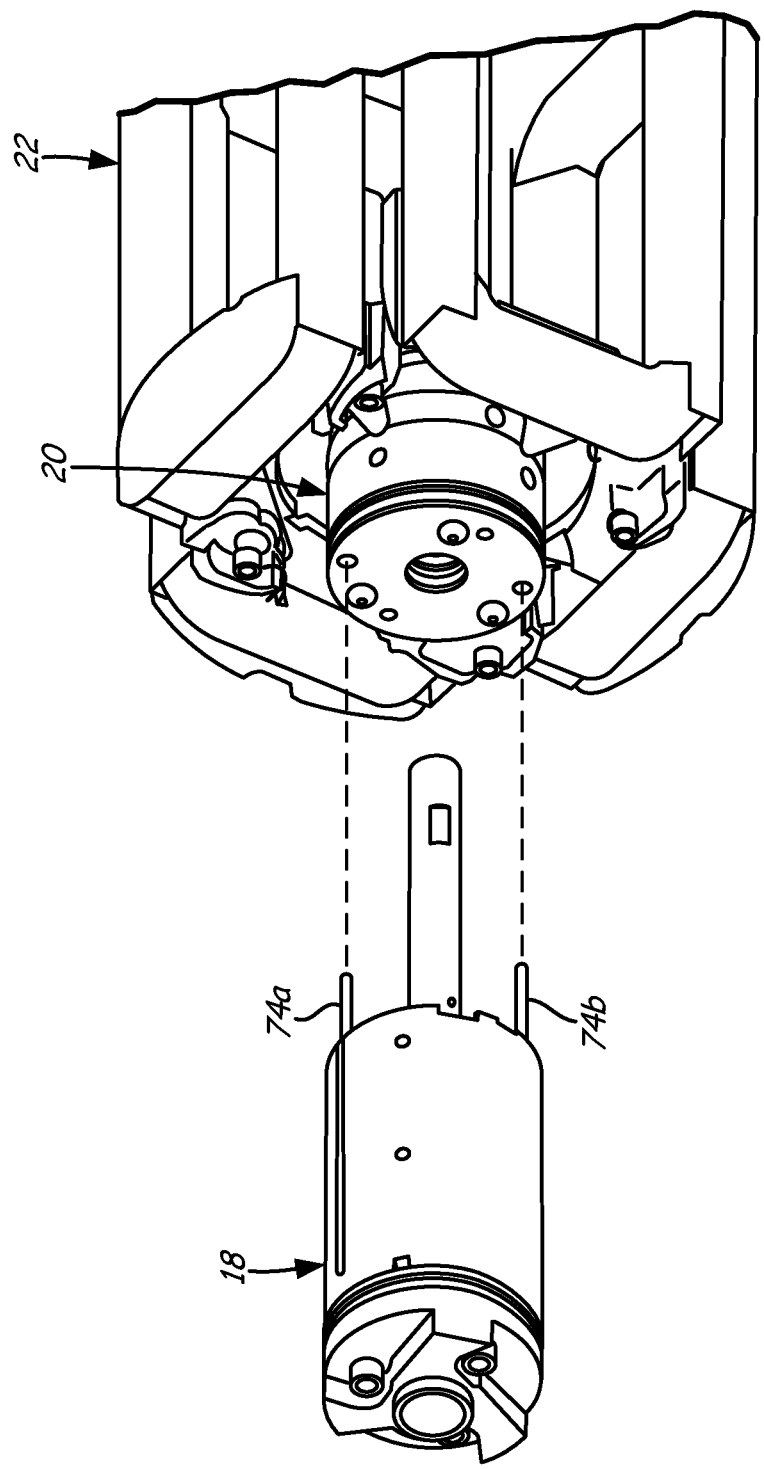
FIG. 6 is an exploded view that illustrates the connection of the rectifier assembly to the resistor pack assembly according to an embodiment of the present invention.

FIG. 6 is an exploded view that illustrates the connection of rectifier assembly 18 to resistor pack assembly 20 according to an embodiment of the present invention. In the embodiment shown in FIG. 6, resistor pack assembly 20 is shown mounted within main field winding 22, but with rotor shaft 12 removed from the view to prevent obscuration of resistor pack assembly 20. Rectifier assembly 18 includes round contact bus bar 74a and round contact bus bar 74b extending axially away from rectifier assembly 18. As described with respect to FIG. 5, first and second round contact bus bars 74a and 74b are received by power bands (e.g., power band 70 shown in FIG. 5) located within connection terminals 50a and 50b, respectively.

Figure 7:
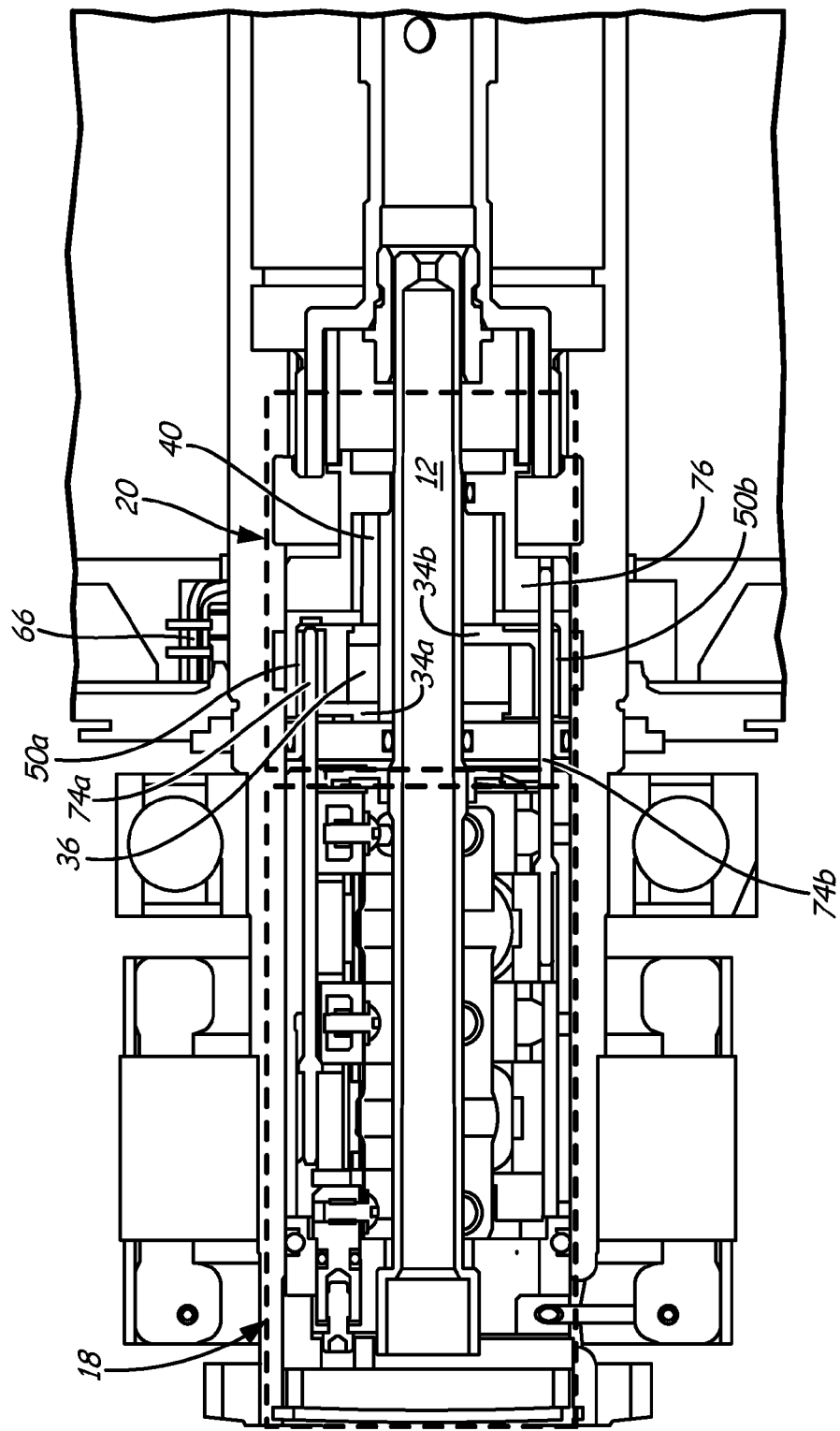
FIG. 7 is a cross-sectional view of the rotating components that illustrates the assembled connection of the rectifier assembly to the resistor pack assembly according to an embodiment of the present invention.

FIG. 7 is a cross-sectional view of the rotating components that illustrates the assembled connection of rectifier assembly 18 to resistor pack assembly 20 according to an embodiment of the present invention. In particular, FIG. 7 illustrates the engagement of round contact bus bars 74a and 74b associated with rectifier assembly 18 into connection terminals associated with mounting plates 34a and 34b respectively. Round contact bus bar 74a extends away from rectifier assembly 18 and engages connection terminal 50a, making contact with power band 70 (not shown in this view) located within connection terminal 50a.

Likewise, round contact bus bar 74b extends away from rectifier assembly 18 and engages connection terminal 50b, making contact with power band 70' (not shown) located within connection terminal 50b. In addition, round contact bus bar 74b extends through connection terminal 50b and is engaged within a grounding aperture 76 located in support assembly 42. The purpose of extending connection pin 74b to make contact with support assembly 42 is to provide an electrical path between rectifier assembly 18 and ground (in this case, rotor shaft 12 is grounded). An alternate method of grounding is achieved by not extending connection pin 74b into contact with support assembly 42 (making the pin shorter), an electrical ground path is created via support assembly 42 and cylindrical grounding resistor 40 to rotor shaft 12. This will create a grounded path to allow built up static charge on the main field windings to safely discharge in a controlled manner. A ground path with resistance limits the amount of static charge that can build up prior to discharge.

FIG. 7 also illustrates wire 66 extending from resistor pack assembly 20 to main field winding 22. In the embodiment shown in FIG. 7, wire 66 extends radially outward from resistor pack assembly 20. Having exited resistor pack assembly, wire 66 is turned 90 degrees and attached via nut (not shown) to main field winding 22.

Figure 8:
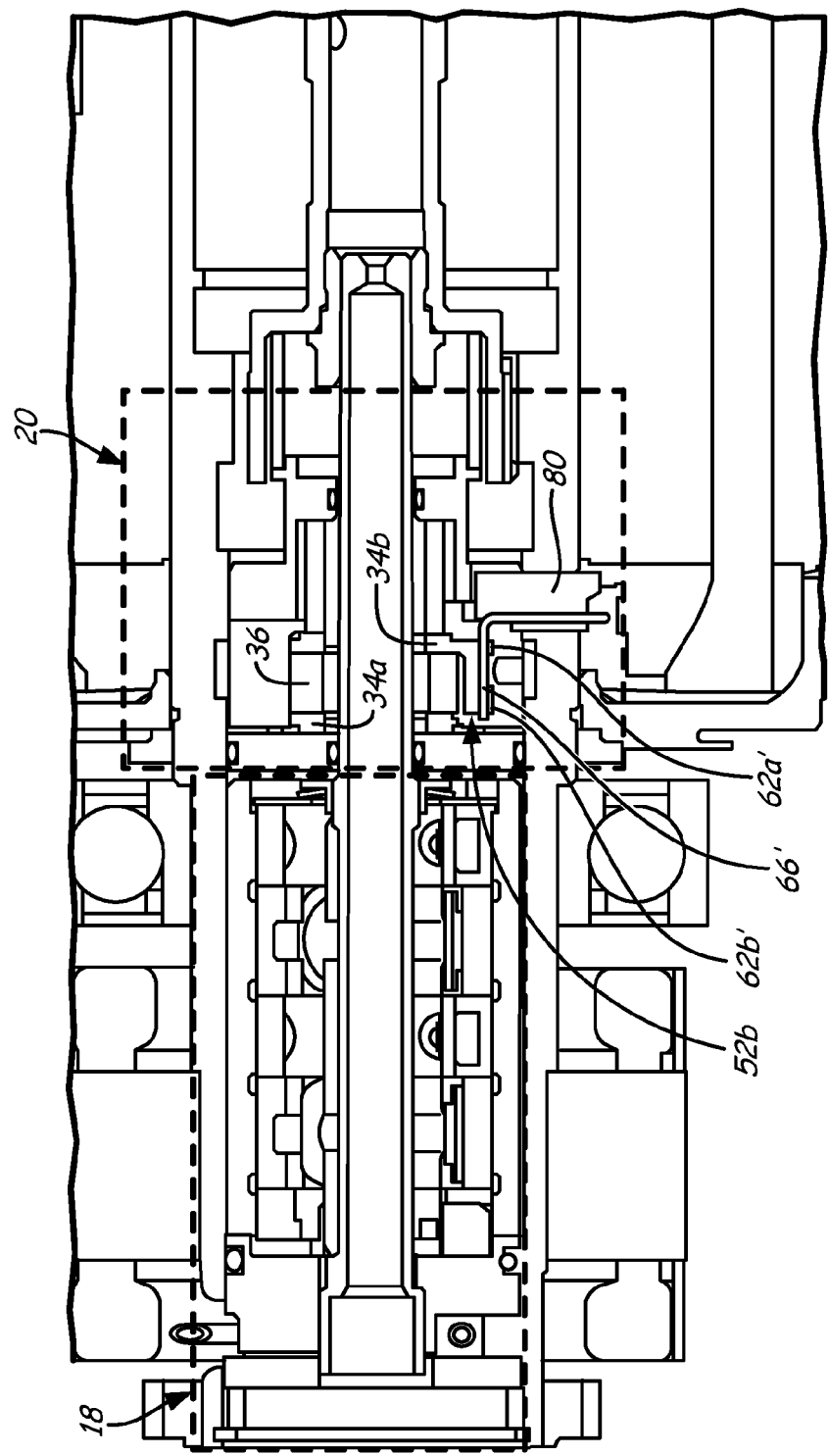
FIG. 8 is a cross-sectional view of the rotating components that illustrates the assembled connection of the resistor pack assembly to the rotor field winding according to an embodiment of the present invention.

FIG. 8 is a cross-sectional view of the rotating components that illustrates the assembled connection of resistor pack assembly 20 to rotor field winding 22 according to an embodiment of the present invention. Once again, mounting plates 34a and 34b, and cylindrical suppression resistor 36 are shown. In addition, FIG. 8 illustrates the connection of wire 66' to connection terminal 52b of mounting plate 34b. In this view, wire 66' is visible passing through apertures 62b' and 62a'. Wire 66' is turned 90 degrees and extends radially outward where it is connected via nut (not shown) to main field winding 22.

Figure 9:
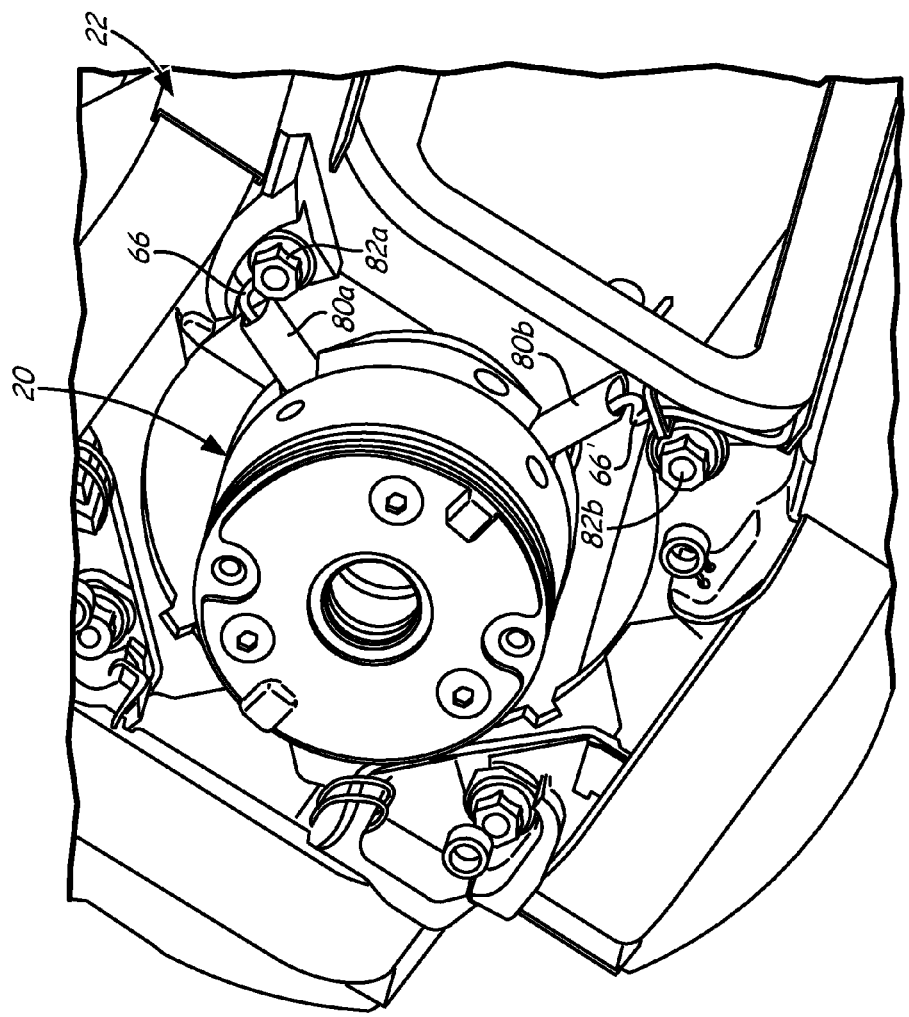
FIG. 9 is an orthogonal view of the assembled connection of the resistor pack assembly to the rotor field winding according to an embodiment of the present invention.

FIG. 9 is a orthogonal view of resistor pack assembly 20 mounted within main field winding 22. Wires 66 and 66' are illustrates extending radially outward from resistor pack assembly 20. Insulator material 80a and 80b is provided around wires 66 and 66' extending in the radial direction to provide electrical isolation and support. Wires 66 and 66' are secured via nuts 82a and 82b, respectively, for electrical connection to main field winding 22.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A resistor pack assembly comprising:
   a first mounting plate having a circular face, a first connection terminal, and a second connection terminal;
   a second mounting plate having a circular face, a third connection terminal and a fourth connection terminal;
   a cylindrical suppression resistor that has a first flat surface and a second flat surface opposite the first flat surface, the cylindrical suppression resistor is located between the first mounting plate and the second mounting plate, wherein the first flat surface contacts the circular face of the first mounting plate and the second flat surface contacts the circular face of the second mounting plate; and
   a cylindrical cover having an inner diameter aperture, wherein the first mounting plate, the second mounting plate, and the cylindrical suppression resistor are located within the inner diameter aperture of the cylindrical cover.

2. The resistor pack assembly of claim 1, wherein the first connection terminal and the third connection terminal extend axially away from the first mounting plate and the second mounting plate, respectively.

3. The resistor pack assembly of claim 2, wherein the first connection terminal and the third connection terminal each include:
   an sleeve-like aperture; and
   a power band that fits within the sleeve-like aperture, wherein the power band is configured to receive a round contact bus bar.

4. The resistor pack assembly of claim 1, wherein the second connection terminal and the fourth connection terminal extend axially away from the first mounting plate and the second mounting plate, respectively.

5. The resistor pack assembly of claim 4, wherein the second connection terminal and the fourth connection terminal each include:
   a first aperture located at a distal end of the connection terminal for receiving a wire; and
   a second aperture located at a proximate end of the connection terminal for receiving a wire.

6. The resistor pack assembly of claim 5, wherein a solder joint is formed between the wire and the first aperture of the connection terminal.

7. The resistor pack assembly of claim 5, wherein a solder joint is formed between the wire and the second aperture of the connection terminal.

8. The resistor pack of claim 1, further including:
   a resistor housing washer having a plurality of apertures for receiving a fastener;
   a support assembly having a plurality of apertures for receiving the fastener supplied via the resistor housing washer; and
   wherein the cylindrical cover is secured by the fastener between the resistor housing washer and the support assembly with the combination of the first and second mounting plates and the cylindrical suppression resistor are secured within the inner diameter aperture of the cylindrical cover.

9. The resistor pack of claim 1, further including:
   a cylindrical grounding resistor located within an inner diameter aperture of the support assembly, wherein the cylindrical grounding resistor creates a resistive connection between the second mounting plate and ground.

10. A generator having a plurality of rotating components that rectify an alternating current (AC) voltage to a direct current (DC) voltage supplied to main field windings, the generator comprising:
- a rotor shaft having an inner diameter;
- a rectifier assembly located within the inner diameter of the rotor shaft and connected to convert the AC voltage to a rectified DC voltage supplied via first and second round contact bus bars that extend axially away from the rectifier assembly; and
- a resistor pack assembly located axially adjacent to the rectifier assembly and within the inner diameter of the rotor shaft, wherein the resistor pack assembly receives the DC voltage supplied by the first and second round contact bus bars and communicates the DC voltage to a main field winding. In parallel to the main field winding connections is a suppression resistor. The resistor pack assembly comprising:
  - a first mounting plate having a circular face, a first connection terminal extending axially away from the circular face and including a sleeve-like aperture for receiving the first round contact bus bar from the resistor pack assembly, and a second connection terminal extending axially away from the circular face for receiving a wire connector for connection to the main field windings;
  - a second mounting plate having a circular face, a third connection terminal extending axially away from the circular face and including a sleeve-like aperture for receiving the second round contact bus bar from the resistor pack assembly, and a fourth connection terminal extending axially away from the circular face for receiving a wire connector for connection to the main field windings; and
  - a cylindrical suppression resistor located between the first mounting plate and the second mounting plate that provides an electrical resistance between the rectified DC voltage supplied by the rectifier assembly and the DC voltage supplied to the main field windings.

11. The generator of claim 10, wherein the second connection terminal and the fourth connection terminal include each include:
- a first aperture located at a distal end of the connection terminal for receiving a wire; and
- a second aperture located at a proximate end of the connection terminal for receiving the wire.

12. The generator of claim 11, wherein the wire extends axially through the first aperture and the second aperture, and then radially away from the resistor pack assembly for connection to the main field windings.

13. The generator of claim 12, further including:
insulator material provided around the wire that insulates the wire and provides mechanical support for the radially extending portion of the wire.

14. The generator of claim 10, further including:
- a resistor housing washer having a plurality of apertures for receiving a fastener;
- a support assembly having a plurality of apertures for receiving the fastener supplied via the resistor housing washer; and
- wherein the cylindrical cover is secured by the fastener between the resistor housing washer and the support assembly with the combination of the first and second mounting plates and the cylindrical suppression resistor are secured within the inner diameter aperture of the cylindrical cover.

15. The generator of claim 1, further including:
- a cylindrical grounding resistor located within an inner diameter aperture of the support assembly, wherein the cylindrical grounding resistor creates a resistive connection between the second mounting plate and ground.

* * * * *